United States Patent [19]

Tada et al.

[11] Patent Number: 5,003,013
[45] Date of Patent: Mar. 26, 1991

[54] INTERMEDIATE FOR COMPOSITE OF POLYMALEIMIDE, POLYCYANATE, EPOXY RESIN AND POLYESTER

[75] Inventors: Hisashi Tada; Takayuki Iseki; Akira Agata, all of Aichi, Japan

[73] Assignee: Mitsubishi Rayon Co., Ltd., Tokyo, Japan

[21] Appl. No.: 320,803

[22] Filed: Mar. 9, 1989

Related U.S. Application Data

[63] Continuation of Ser. No. 944,113, Dec. 22, 1986, abandoned.

[30] Foreign Application Priority Data

Dec. 20, 1985 [JP] Japan .................. 60-285664
Dec. 20, 1985 [JP] Japan .................. 60-285665

[51] Int. Cl.$^5$ .................. C08L 63/10; C08L 67/02
[52] U.S. Cl. .................. 525/438; 525/530; 523/466; 428/251; 428/254; 428/273; 428/283; 428/285; 428/290; 428/902
[58] Field of Search .................. 525/438, 445, 530; 523/466; 428/251, 254, 273, 283, 285, 290, 902

[56] References Cited

U.S. PATENT DOCUMENTS 4,110,364  8/1978  Gaku et al. .................. 525/422
4,429,112  1/1984  Gaku et al. .................. 528/313

OTHER PUBLICATIONS

*Chemical Abstracts*, vol. 92, No. 6, 1980, p. 72, abstract no. 43372q, Gaku et al., "Organocyanate Coating Compositions".
*Chemical Abstracts*, vol. 100, No. 2, 1984, p. 47, abstract no. 7858c, Mitsui Petrochemical Ind., "Heat-Resistant Resin Compositions".
*Chemical Abstracts*, vol. 103, No. 4, 1985, p. 39, abstract no. 23471p, Toho Beslon Co., "Prepregs for Impact-Resistant Composite Materials".

*Primary Examiner*—John C. Bleutge
*Assistant Examiner*—Robert E. L. Sellers, II
*Attorney, Agent, or Firm*—Sughrue, Mion, Zinn, Macpeak & Seas

[57] ABSTRACT

An intermediate for a composite material is described, comprising a reinforcing material impregnated with a resin composition which comprises: (A) 100 parts by weight of a mixture of (I) a polyfunctional maleimide and (II) a polyfunctional cyanate or an oligomer thereof, or a preliminary reaction product of (I) and (II); (B) from 5 to 100 parts by weight of an epoxy compound; and (C) from 5 to 50 parts by weight of a polyester compound.

9 Claims, No Drawings

INTERMEDIATE FOR COMPOSITE OF POLYMALEIMIDE, POLYCYANATE, EPOXY RESIN AND POLYESTER

This is a continuation of application Ser. No. 06/944,113, filed Dec. 22, 1986, now abandoned.

FIELD OF THE INVENTION

The present invention relates to an intermediate that can be used in the production of a composite material having superior heat resistance, water resistance and mechanical properties.

BACKGROUND OF THE INVENTION

A variety of resin compositions have heretofore been used as the matrices of composite materials. In the area of thermosetting resins, epoxy resins have been extensively used because, in addition to their inherent superior mechanical properties (strength and elongation, in particular), they achieve better adhesion to reinforcing materials to have them exhibit superior strength properties in the resulting composite materials than any other thermosetting resins. There is, however, a growing need to produce composite materials having even higher performance, particularly, in terms of resistance to heat, water and impact, and in order to meet this demand, the use of polyfunctional maleimides, polyfunctional cyanates or oligomers thereof, or preliminary reaction products thereof as matrix components has been reviewed. For example, a resin composition which comprises a mixture of polyfunctional maleimides and polyfunctional cyanates and an epoxy compound, as described in U.S. Pat. Nos. 4,110,364, 4,429,112 and 4,404,330, Japanese Pat. Publication No. 31279/77 and Japanese Pat. Publication (OPI) No. 184524/85 (the term "OPI" as used herein means a "published unexamined Japanese patent application") can provide a cured product excellent in various properties such as heat resistance.

However, the cured product of resin composition was still insufficient in impact resistance.

Further, a prepreg for composite material resistant to impact in which the above descibed resin composition is impregnated with carbon fiber having 1.5% or more of elongation has been proposed in Japanese Pat. Publication (OPI) No. 15439/85.

However, this does not describe compression characteristics after impact which has been established as impact resistance evaluation for composite materials, in particular for carbon fiber composite materials as primary structural material for an aircraft, and it is desired further improvement.

SUMMARY OF THE INVENTION

An object, therefore, of the present invention is to provide an intermediate for a composite material having superior resistance to heat, water, and impact.

As a result of various studies conducted to attain this object, the present inventors have found that it can be achieved with an intermediate that comprises a reinforcing material impregnated with a resin composition which comprises: (A) 100 parts by weight of a mixture of (I) a polyfunctional maleimide and (II) a polyfunctional cyanate or an oligomer thereof, or a preliminary reaction product of (I) and (II); (B) from 5 to 100 parts by weight of an epoxy compound; and (C) from 5 to 50 parts by weight of a polyester compound.

DETAILED DESCRIPTION OF THE INVENTION

The polyfunctional maleimide (I) used in the present invention is a compound having two or more maleimide groups and is illustrated by bismaleimides represented by formula(III)

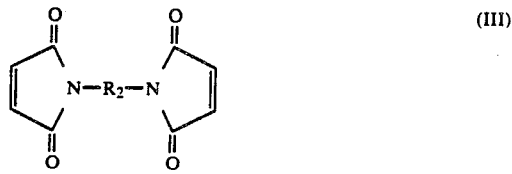

wherein $R_2$ is a divalent aromatic or aliphatic group, as well as prepolymers formed from such bismaleimides and diamines. Typical example of bismaleimides represented by formula (III) is m-xylenebismaleimide. A bismaleimide of formula (III) may be prepared by a known method which comprises reacting maleic anhydride with a diamine to form a bismaleinaminc acid, then subjecting said acid to dehydrative cyclization. Aromatic diamines which are heat-resistant are preferable for use as amines, but if a particular property such as flexibility is desired, aliphatic diamines may be used either alone or in combination with aromatic diamines. Illustrative diamines include m-phenylenediamine, p-phenylenediamine, 4,4'-diaminodiphenylsulfone, 3,3'-diaminodiphenylsulfone, 4,4'-diaminodiphenylmethane, 4,4'-diaminodiphenylether, etc.

Preferable examples of the polyfunctional maleimide used in the present invention include a bismaleimide of 4,4'-diaminodiphenylmethane, etc.

The polyfunctional cyanate (II) used in the present invention is an organic compound having two or more cyanic acid ester groups or an oligomer thereof, and is preferably represented by formula (IV)

$$R_3(O-C\equiv N)_n \qquad (IV)$$

wherein n is an integer of 2 to 5, and $R_3$ is an aromatic organic residual group. Illustrative polyfunctional cyanates include 1,3- or 1,4-dicyanatobenzene, 4,4-dicyanatobiphenyl, bis(4-cyanatophenyl)methane, 2,2-bis(4-cyanatophenyl)ethane, 2,2-bis(4-cyanatophenyl)-propane, bis(4-cyanatophenyl)sulfone, etc. These polyfunctional cyanates may be used not only in the form of triazine oligomers prepared by trimerization of cyanato compounds, but also in the form of prepolymers prepared by reaction with amines which contain diamines selected from among those which can be employed in the synthesis or modification of the aforementioned polyfunctional maleimides.

Preferable examples of the polyfunctional cyanate include 2,2-bis(4-cyanatophenyl)propane, etc.

In the present invention, the aforementioned polyfunctional maleimide (I) and polyfunctional cyanate (II) are used independently as component (A). Alternatively, the product prepared by performing the preliminary reaction of (I) and (II) in the presence or absence of a catalyst may be used as component (A). The choice of the most appropriate material for use as component (A) depends on the specific intended use of the composite material to be finally produced.

Any known epoxy resin may be used as the epoxy compound (B) in the present invention. Illustrative epoxy resins include: polyglycidyl ethers of diphenylolalkanes such as diphenylolpropane, diphenylolethane and diphenylolmethane; polyglycidyl ethers of polyvalent phenols such as novolaks, cresols and resols; and epoxy resins that are formed by epoxidization of alicyclic compounds such as cyclohexane, cyclopentadiene and dicyclopentadiene, which include esters of 3,4-epoxy-6-methyl-cyclohexane-carboxylic acids and 3,4-epoxy-6-methyl-cyclohexane-carbinol, poly(epoxyalkyl)ethers of aliphatic polyoxy compounds such as ethylene glycol and glycerin, and epoxy alkyl esters of carboxylic acids such as glycidyl esters of aromatic or aliphatic carboxylic acids. The preliminary reaction products of epoxy resins and curing agents, as described in U.S. Pat. Nos. 3,390,037, 2,970,983 and 3,067,170 may also be used. Epoxy resins may simply be used in the form of mixtures with curing agents. The aforementioned epoxy resins may be used either independently or in combinations thereof.

Advantageous epoxy compounds include a diglycidyl ether of bisphenol A or $H_2C(C_6H_4OH)_2$ (bisphenol F), a preliminary reaction product of a diglycidyl ether of bisphenol A or bisphenol F and diaminodiphenylsulfone having an epoxy to NH ratio of 4/1, and a preliminary reaction product of Epikote 828 (Trade mark of Shell International Chemical Corp.) and 4,4'-diaminodiphenylsulfone having an epoxy to NH ratio of 4/1.

The polyester compound (C) used in the present invention is preferably represented by formula (V) or formula (VI)

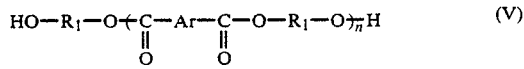
(V)

wherein Ar is a phenylene group; and $R_1$ is a divalent aliphatic group;

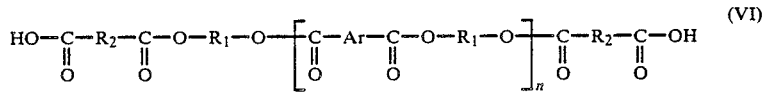
(VI)

wherein Ar is a phenylene group; $R_1$ is a divalent aliphatic group; and $R_2$ is a divalent aromatic or aliphatic group.

The phenylene group denoted by substituent Ar in formulae (V) and (VI) may be ortho, meta or para.

The divalent aliphatic group denoted by $R_1$ in formulae (V) and (VI) is preferably a straight-chain or branched-chain aliphatic group having from 2 to 6 carbon atoms and include the following groups:

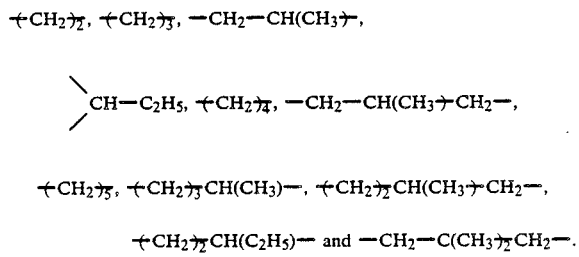

The divalent aromatic group denoted by $R_2$ in formula (VI) is illustrated by a phenylene group, and the divalent aliphatic group denoted by $R_2$ may be the same as what is selected for $R_1$.

The polyester compound (C) used in the present invention preferably has a softening point of not higher than 100° C., and more preferably not higher than 70° C. If the polyester compound has a softening point exceeding 100° C., its miscibility with the polyfuncitonal maleimide, polyfuncitonal cyanate and epoxy compound becomes too low to attain a uniform composition. This polyester compound preferably has a number average molecular weight of from 500 to 10,000, and more preferably from 500 to 3,000. If the number average molecular weight of the polyester compound is less than 500, the resulting compound has an undesirably low viscosity. If, on the other hand, the number average molecular weight of the polyester compound exceeds 10,000, it cannot be easily mixed with the other components. If the polyester compound has at its terminal a carboxylic acid as shown by formula (VI), it preferably has an acid value which is within the range of 20-150, more preferably 40-100.

The polyester compound used in the present invention may be prepared by any of the methods that are conventionally employed to produce other linear polyesters. For preparing a carboxylic acid-terminated polyester compound represented by formula (VI), a twostage method may be employed, wherein a polyvalent carboxylic acid is first reacted with an excess of a polyhydric alcohol until an acid value not exceeding 20 is attained, then the reaction product is further reacted with a polyfunctional polyvalent carboxylic acid, say, trimellitic anhydride. This two-stage method is preferable since it allows a polyester resin of high acid value to be readily synthesized.

The polyvalent carboxylic acid and polyhydric alcohol that are used in the preparation of the polyester resin of the present invention may be selected from among those which are employed in the manufacture of conventional polyester resins. Illustrative polyvalent carboxylic acids include aliphatic polyvalent carboxylic acids such as adipic acid and succinic acid; phthalic acid, phthalic anhydride, isophthalic acid, terephthalic acid, lower alkyl esters thereof, and other aromatic polyvalent carboxylic acids such as tetrachlorophthalic anhydride, tetrabromophthalic anhydride, trimellitic acid, trimellitic anhydride, and pyromellitic dianhydride. Adipic acid, succinic acid, phthalic acid, isophthalic acid, and terephthalic acid are preferable. When the polyester resin is represented by formula (V) or (VI), the polyvalent carboxylic acid is preferably phthalic acid, isophthalic acid, or terephthalic acid. Illustrative polyhydric alcohols include ethylene glycol, propylene glycol, 1,3-butylene glycol, 1,6-hexane diol, diethylene glycol, dipropylene glycol, neopentyl glycol, trimethylene glycol, triethylene glycol, glycerin, trimethylolethane, trimethylolpropane, trishydroxymethylaminomethane, pentaerythritol, dipentaerythritol, and resorcin. Ethylene glycol, neopentyl glycol, trimethylene glycol, and resorcin are preferable.

Polyvalent carboxylic acids that may be used as end blocking agents include the aforementioned aromatic polyvalent carboxylic acids, as well as aliphatic polyvalent carboxylic acids such as tetrahydrophthalic anhydride, hexahydrophthalic anhydride, chlorendic anhydride, 3,6-endomethylenetetrahydrophthalic anhydride, maleic anhydride, tetrahydromaleic anhydride, fumaric acid, itaconic acid, succinic acid, succinic anhydride, adipic acid, azelaic acid, sebacic acid and methylcyclohexenetricarboxylic acid. Trimellitic acid and trimellitic anhydride are preferable.

It is essential for the purpose of the present invention that the resin composition used should consist of 100 parts by weight of component (A), from 5 to 100 parts by weight of component (B), and from 5 to 50 parts by weight of component (C). If the content of the epoxy compound used as component (B) is less than 5 parts by weight per 100 parts by weight of component (A), the desired adhesion to a substrate is not attained. If the content of component (B) exceeds 100 parts by weight, satisfactory heat resistance is not attainable. If the content of the polyester compound used as component (C) is less than 5 parts by weight per 100 parts by weight of component (A), the desired impact resistance will not be exhibited by the resulting composition. If the content of component (C) exceeds 50 parts by weight, the decrease in heat and solvent resistance is pronounced. The ratio of the polyfuncitonal maleimide (I) to polyfuncitonal cyanic acid ester or oligomer thereof (II) present in component (A) is preferably within the range of 5/95 to 15/85 on a weight basis. If the proportion of (I) is greater than 15 wt% of component (A), heat and water resistance is attained but, on the other hand, high curing temperatures are required, and a drop in impact resistance occurs. If the proportion of (I) is less than 5 wt% of component (A), an improvement in impact resistance is achieved but the heat resistance is decreased undesirably.

The resin composition used in the present invention may optionally incorporate a catalyst in order to impart desirable properties to the cured product of resin or to control the thermosetting property of resin.

Illustrative catalysts that can be used for attaining these purposes include: latent curing catalysts such as boron trifluoride amine complex compounds (e.g., boron trifluoride monoethylamine complex); tertiary amines such as triethylenediamine, 1,8-diazabicyclo(5,4,0)undecene, N,N-dimethylbenzylamine, N-methylmorpholine and tri-n-butylamine; organic peroxides such as dicumyl peroxide, benzoyl peroxide and t-butyl hydroperoxide; and metal salts of organic acids such as zinc octylate, lead octylate, zinc naphthenate and cobalt naphthenate. Among these catalysts boron trifluoride monoethylamine complex, dicumyl peroxide and zinc octylate are preferably used. The amount of catalyst used may be determined in accordance with the specific object of its use, and, in order to ensure the stability of the resulting resin composition, the catalyst is preferably used in an amount of from 0.2 to 3 wt% of the total content of the resin components (A), (B), and (C).

The reinforcing material used in the intermediate for composite material of the present invention is appropriately selected from among inorganic fibers such as glass fibers, carbon fibers, boron fibers and silicon carbide fibers, organic fibers such as poly-p-phenylene terephthalamide, poly-p-benzamide and polyamide hydrazide, asbestos, mica, talc, etc. The inorganic or organic fibers are used in the form of chopped strands, yarns, tape, sheet, woven or knitted fabrics, mats or paper-like materials. These reinforcing materials may be used either independently or as a mixture.

Depending upon the specific use of the final composite material, the intermediate of the present invention may incorporate an additive such as a flow control agent (e.g., fine silicon oxide powder), a pigment, a dye, a stabilizer, a plasticizer, a lubricant, tar or asphalt. These optional additives may be used either independently or in combination with reinforcing materials. The amount of the additive used is preferably 5 wt% or less of the total content of resin components (A), (B), and (C). Particularly the flow control agent is preferably used in an amount of from 0.2 to 3.0 wt% of the total content of the resin components (A), (B), and (C).

The reinforcing material is preferably impregnated into the resin composition by the following method: the resin composition is subjected to a preliminary reaction at from 50 to 120° C. to form a prepolymer, which then is dissolved in a solvent such as methyl ethyl ketone and impregnated into the reinforcing material. The content of the reinforcing material in the intermediate for composite material of the present invention is preferably within the range of 0.5 to 80 vol%. In addition to the epoxy resin, other thermosetting resins or thermoplastic resins may be used in the intermediate of the present invention.

The invention is described in greater detail with reference to the following example, which is not to be construed as limiting the scope thereof.

EXAMPLE 1

Bis(4-maleimidophenyl)methane, 2,2-bis(4-cyanatophenyl)propane, Epikote 807 of Shell International Chemicals Corp. (epoxy equivalent, 172), and polyester (a) that was composed of terephthalic acid (acid component) and neopentyl glycol (glycol component) and which had a softening point of 25° C. were mixed in the proportions indicated in Table 1. To the mixture, 1.25 parts by weight of AEROSIL 380 (fine silicon oxide powder of Japan Aerosil Inc.) and 0.2 parts by weight of dicumyl peroxide (curing catalyst) were added. The resulting mixture was subjected to a preliminary reaction at 70° C. for 30 minutes to form a prepolymer. The prepolymer was sandwiched between two glass sheets to provide a predetermined thickness and subsequently heated at 180° C. for 2 hours to obtain a cured resin sheet. Another sample of the uncured prepolymer was dissolved in methyl ethyl ketone and carbon fiber filaments (Pyrofil T-3, Trade mark of Mitsubishi Rayon Co. Ltd.), being impregnated with the prepolymer solution, were wound around a drum to form a coil. The coil was dried and cut open to make a unidirectional prepreg (Fiber areal weight, 145 g/m$^2$; resin content, 33 wt%). Sheets of this prepreg were laminated for [0°]16, or laminated quasi-isotropically for [+45°/0°/−45°/+90°]4S, and cured at 180° C. for 2 hours to prepare a composite material. The resin sheet and the composite material were subjected to various tests, the results of which are shown in Table 2. The data of glass transition temperature (Tg) given in Table 2 are expressed as the temperature for maximum tan δ that was obtained by measurement with a dynamic mechanical spectrometer (manufactured by Rheometrics Inc.). The resistance of the composite to heat and water was evaluated by performing a compression test on the [0°]16 laminated composite in the direction of 0° at 121° C. in accordance with ASTM D-695 after it had been submerged in water (71° C.) for 14 days. The impact resistance of the composite material was evaluated by using the [+45°/0°/−45°/+90°]4S laminated sheet in the following manner in accordance with NASA RP1092: a test piece (4×6×0.25 in.) was fixed on a table having a hole (3×5 in.); a weight (4.9 kg) with a nose having a radius of ½ inch was dropped on the center of the test piece to apply an impact of 1,500 lbs. per inch of the laminate thickness; the test piece was thereafter subjected to a compression test. All of the data for the composite material were normalized for a fiber content of 60%.

EXAMPLE 2

A resin sheet and a composite material were prepared as in Example 1 except that polyester (a) was replaced by a polyester (b) that had a softening point of 20° C. and which was composed of terephthalic acid (acid component) and a 1/1 (by weight) mixture of ethylene glycol and neopentyl glycol (glycol component). The resin sheet and the composite material thus prepared were subjected to various tests, the results of which are summarized in Table 2.

EXAMPLE 3

A resin sheet and a composite material were prepared as in Example 1 except that Epikote 828 (Trade mark of Shell International Chemicals Corp.) having an epoxy equivalent of 184-194 was used as an epoxy resin. The resin sheet and the composite material thus prepared were subjected to various tests, the results of which are summarized in Table 2.

EXAMPLE 4 AND COMPARATIVE EXAMPLES 1 AND 2

Additional resin sheets and composite materials were prepared as in Example 1 except that the amount of polyester (a) was altered as shown in Table 1. The resin sheets and composite materials thus prepared were subjected to various tests, the results of which are summarized in Table 2.

EXAMPLE 5 AND COMPARATIVE EXAMPLES 3 AND 4

Additional resin sheets and composite materials were prepared as in Example 1 except that the amount of Epikote 807 was altered as shown in Table 1. The resin sheets and composite materials thus prepared were subjected to various tests, the results of which are summarized in Table 2.

EXAMPLES 6 AND 7

Additional resin sheets and composite materials were prepared as in Example 1 except that the amounts of bis(4-maleimidophenyl)methane and 2,2-bis(4-cyanatophenyl)propane were altered as shown in Table 1. The resin sheets and composites thus prepared were subjected to various tests, the results of which are summarized in Table 2.

EXAMPLE 8

A resin sheet and a composite material were prepared as in Example 1 except that polyester (a) was replaced by a polyester (c) that had the terminals of polyester (a) blocked with trimellitic anhydride and which had a softening point of 30° C. The resin sheet and the composite material thus prepared were subjected to various tests, the results of which are summarized in Table 2.

EXAMPLE 9 AND COMPARATIVE EXAMPLE 5

Additional resin sheets and composite materials were prepared as in Example 8, except that the amount of polyester (c) was altered as shown in Table 1. The resin sheets and composite materials thus prepared were subjected to various tests, results of which are summarized in Table 2.

EXAMPLE 10

A resin sheet and a composite material were prepared as in Example 1 except that a preliminary reaction product of Epikote 828 as an epoxy resin and a 4,4'-diaminodiphenylsulfone having an epoxy to NH ratio of 4/1, in which the reaction time is 2 hours at 160° C., was used as an epoxy compound (an epoxy equivalent: 265). The resin sheet and the composite material thus prepared were subjected to various tests, the results of which are summarized in Table 2.

EXAMPLE 11

A resin sheet and a composite material were prepared as in Example 1 except that polyester (a) was replaced by a polyester (d) that had a softening point of 30° C. and which was composed of phthalic acid (acid component) and ethylene glycol (glycol component). The resin sheet and the composite material thus prepared were subjected to various tests, the results of which are summarized in Table 2.

EXAMPLE 12

A resin sheet and a composite material were prepared as in Example 1 except that polyester (a) was replaced by a polyester (e) that had a softening point of 20° C. and which was composed of isophthalic acid (acid component) and trimethylene glycol (glycol component). The resin sheet and the composite material thus prepared were subjected to various tests, the results of which are summarized in Table 1.

EXAMPLE 13

A resin sheet and a composite material were prepared as in Example 1 except that polyester (a) was replaced by a polyester (f) that had a softening point of 35° C. and which was composed of adipic acid (acid component) and ethylene glycol (glycol component). The resin sheet and the composite material thus prepared were subjected to various tests, the results of which are summarized in Table 2.

EXAMPLE 14

A resin sheet and a composite material were prepared as in Example 1 except that polyester (a) was replaced by a polyester (g) that had a softening point of 40° C and which was composed of succinic acid (acid component) and resorcin (glycol component). The resin sheet and the composite material thus prepared were subjected to various tests, the results of which are summarized in Table 2.

EXAMPLE 15

A resin sheet and a composite material were prepared as in Example 1 except that AEROSIL 380 was not added. The resin sheet and the composite material thus prepared were subjected to various tests, the results of which are summarized in Table 2.

EXAMPLE 16

A resin sheet and a composite material were prepared as in Example 1 except that m-xylenebismaleimide prepared from m-xylenediamine and maleic anhydride was used as polyfunctional maleimide and 1,4-dicyanatobenzene was used as polyfunctional cyanate. The resin sheet and the composite material thus prepared were subjected to various tests, the results of which are summarized in Table 2.

COMPARATIVE EXAMPLE 6

A resin sheet and a composite material were prepared as in Example 1 except that a prepreg was prepared in the same resin composition, same reinforcing material, and same manner as described in Example 1 of Japanese Pat. Publication (OPI) No. 15439/85. The resin sheet and the composite material thus prepared were subjected to various tests, the results of which are summarized in Table 2.

TABLE 1

| Run No. | Polyfunctional maleimide (parts by weight) | Polyfunctional cyanate (parts by weight) | Epoxy Compound Epikote 807 (parts by weight) | Epoxy Compound Epikote 8282 (parts by weight) | Polyester (parts by weight) |
|---|---|---|---|---|---|
| Example 1 | 10 | 90 | 12.5 | — | (a) 12.5 |
| Example 2 | 10 | 90 | 12.5 | — | (b) 12.5 |
| Example 3 | 10 | 90 | — | 12.5 | (a) 12.5 |
| Example 4 | 10 | 90 | 12.5 | — | (a) 25.0 |
| Example 5 | 10 | 90 | 50 | — | (a) 12.5 |
| Example 6 | 3 | 97 | 12.5 | — | (a) 12.5 |
| Example 7 | 20 | 80 | 12.5 | — | (a) 12.5 |
| Example 8 | 10 | 90 | 12.5 | — | (c) 12.5 |
| Example 9 | 10 | 90 | 12.5 | — | (c) 25.0 |
| Example 10 | 10 | 90 | — | 12.5* | (a) 12.5 |
| Example 11 | 10 | 90 | 12.5 | — | (d) 12.5 |
| Example 12 | 10 | 90 | 12.5 | — | (e) 12.5 |
| Example 13 | 10 | 90 | 12.5 | — | (f) 12.5 |
| Example 14 | 10 | 90 | 12.5 | — | (g) 12.5 |
| Example 15 | 10 | 90 | 12.5 | — | (a) 12.5 |
| Example 16 | 10 | 90 | 12.5 | — | (a) 12.5 |
| Comparative Example 1 | 10 | 90 | 12.5 | — | — |
| Comparative Example 2 | 10 | 90 | 12.5 | — | (a) 75 |
| Comparative Example 3 | 10 | 90 | — | — | (a) 12.5 |
| Comparative Example 4 | 10 | 90 | 120 | — | (a) 12.5 |
| Comparative Example 5 | 10 | 90 | 12.5 | — | (c) 75 |
| Comparative Example 6 | 500** | | 800*** | — | |

*Preliminary reaction product of Epikote 828 and 4,4'-diaminodiphenylsulfone.
**Total amount of polyfunctional maleimide and polyfunctional cyanate.
***Phenol novolak type epoxy resin.

TABLE 2

| Run No. | Resin sheet Tg (°C.) | Resin sheet Bending strength* (kg/mm²) | Resin sheet Elastic modulus in bending* (kg/mm²) | Composite material Compressive strength for 0° at WET-121° C.** (kg/mm²) | Composite material Compressive strength after impact application** (kg/mm²) |
|---|---|---|---|---|---|
| Example 1 | 225 | 22.9 | 415 | 140 | 22 |
| Example 2 | 205 | 23.5 | 400 | 125 | 23 |
| Example 3 | 233 | 23.4 | 412 | 145 | 21 |
| Example 4 | 210 | 22.4 | 405 | 130 | 22 |
| Example 5 | 202 | 21.8 | 400 | 125 | 20 |
| Example 6 | 205 | 21.0 | 390 | 100 | 23 |
| Example 7 | 230 | 22.0 | 400 | 120 | 19 |
| Example 8 | 229 | 22.5 | 418 | 137 | 22 |
| Example 9 | 205 | 23.0 | 402 | 135 | 23 |
| Example 10 | 235 | 22.8 | 420 | 140 | 22 |
| Example 11 | 215 | 21.2 | 408 | 135 | 21 |
| Example 12 | 224 | 22.0 | 413 | 131 | 23 |
| Example 13 | 200 | 21.3 | 400 | 128 | 19 |
| Example 14 | 208 | 20.8 | 415 | 124 | 20 |
| Example 15 | 228 | 23.0 | 415 | 135 | 22 |
| Example 16 | 205 | 21.3 | 420 | 128 | 20 |
| Comparative Example 1 | 267 | 22.2 | 417 | 140 | 17 |
| Comparative Example 2 | 170 | 20.5 | 380 | 60 | 23 |
| Comparative Example 3 | 230 | 21.0 | 395 | 120 | 17 |
| Comparative Example 4 | 150 | 18.0 | 300 | 60 | 15 |

TABLE 2-continued

| | Resin sheet | | | Composite material | |
|---|---|---|---|---|---|
| Run No. | Tg (°C.) | Bending strength* kg/mm² | Elastic modulus in bending* (kg/mm²) | Compressive strength for 0° at WET-121° C.** (kg/mm²) | Compressive strength after impact application** (kg/mm²) |
| Example 4 | | | | | |
| Comparative Example 5 | 176 | 18.9 | 375 | 60 | 21 |
| Comparative Example 6 | 248 | 22.5 | 420 | 133 | 17 |

*Bending strength and Elastic modulus in bending were measured according to ASTM D-790.
**Compressive strength was measured according to ASTM D-695.

As described above, the present invention provides an intermediate for a composite material which is improved in resistance to heat, water and impact, and the improvement is achieved by using a resin composition comprising (A) a mixture of (I) a polyfunctional maleimide and (II) a polyfunctional cyanate or an oligomer thereof, or a preliminary reaction product of (I) and (II); (B) an epoxy compound; and (C) a polyester compound, in a specific composition ratio of the present invention.

While the invention has been described in detail and with reference to specific embodiments thereof, it will be apparent to one skilled in the art that various changes and modifications can be made therein without departing from the spirit and scope thereof.

What is claimed is:

1. An intermediate for a composite material comprising a reinforcing material impregnated with a resin composition which comprises:
   (A) 100 parts by weight of a mixture of
      (I) a polyfunctional maleimide and
      (II) a polyfunctional cyanate or an oligomer thereof,
      or
      a preliminary reaction product of (I) and (II);
   (B) from 5 to 100 parts by weight of an epoxy compound; and
   (C) from 5 to 50 parts by weight of a polyester compound having a softening point of from 20° C. to not higher than 100° C. and a number average molecular weight of from 500 to 10,000 represented by formula (V):

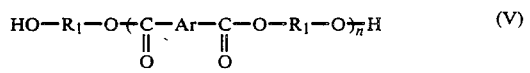

wherein Ar is a phenylene group, $R_1$ is a divalent aliphatic group having from 2 to 6 carbon atoms; and n is an integer of from about 2 to about 52.

2. An intermediate for a composite material as claimed in claim 1, wherein the polyfunctional maleimide (I) is a bismaleimide of diaminodiphenylmethane.

3. An intermediate for a composite material as claimed in claim 1, wherein the polyfunctional cyanate (II) is 2,2-bis (4-cyanatophenyl)propane.

4. An intermediate for a composite material as claimed in claim 1, wherein the epoxy compound (B) is selected from the group consisting of:
   (a) a diglycidyl ether of bisphenol A or bisphenol F and
   (b) a preliminary reaction product of a diglycidyl ether of bisphenol A or F and a diaminodiphenylsulfone having an epoxy to NH ratio of 4/1.

5. An intermediate for a composite material as claimed in claim 1, wherein the polyester compound (C) is the reaction product of terephthalic acid and neopentyl glycol.

6. An intermediate for a composite material as claimed in claim 1, wherein the polyester compound (C) is the reaction product of terephtyalic acid and neopentyl glycol which has the terminals thereof blocked with trimellitic anhydride, said reaction product having a number average molecular weight of from 500 to 10,000.

7. An intermediate for a composite material as claimed in claim 1 which contains from 0.2 to 3 wt% of a fine silicon oxide powder.

8. An intermediate for a composite material as claimed in claim 1, wherein the weight ratio of (I) to (II) in component (A) ranges from 5/95 to 15/85.

9. An intermediate for a composite material as claimed in claim 1 which contains from 0.2 to 3 wt% of a catalyst selected from the group consisting of a boron trifluoride monoethylamine complex, dicumyl peroxide, and zinc octylate.

* * * * *